United States Patent [19]
Nelsen et al.

[11] 3,721,461
[45] March 20, 1973

[54] APPARATUS AND METHOD FOR CONVERTING AN IMPLEMENT BETWEEN OPERATING AND TRANSPORT POSITIONS

[75] Inventors: Arlyn Ray Nelsen; Gerald Franklyn Meiers, both of Ottumwa, Iowa

[73] Assignee: Deere & Company, Molin, Ill.

[22] Filed: Aug. 27, 1971

[21] Appl. No.: 175,517

[52] U.S. Cl. ............... 280/415 R, 280/34 A, 172/625
[51] Int. Cl. ................................................. B60d 7/00
[58] Field of Search.280/415 R, 411 A, 411 C, 34 A, 280/43.23; 172/625, 248

[56] References Cited

UNITED STATES PATENTS

| | | | |
|---|---|---|---|
| 2,955,848 | 10/1960 | Hyland et al. | 280/411 C |
| 3,288,480 | 11/1966 | Calkins et al. | 280/43.23 |
| 3,437,353 | 4/1969 | Lange | 280/415 R |
| 3,515,408 | 6/1970 | Cagle | 280/415 R |
| 3,635,495 | 1/1972 | Orendorff | 280/415 R |

Primary Examiner—Leo Friaglia
Attorney—H. Vincent Harsha et al.

[57] ABSTRACT

Apparatus and method for converting an elongated implement between a wide operating position and a narrow, endwise transport position, the apparatus comprising a hitch structure alternately securable in either an operating position on the front side of the implement or a transport position on one end thereof, a pair of wheels alternately securable in either an operating position on a rockshaft extending along the rear side of the implement or a transport position on a pair of front and rear wheel supports, an adjustable jack connected to the hitch structure, and a stand on one end of the implement, the stand being movable between raised and lowered positions. The method of converting the implement from its operating to its transport position comprises the steps of raising the implement by rotating the rockshaft, securing the stand in its lowered position, lowering the implement until the wheel nearest the stand clears the ground, removing that wheel from the rockshaft and securing it to the rear wheel support, lowering the implement further until the other wheel clears the ground, removing the other wheel from the rockshaft and securing it to the support on the front side of the implement, and finally, removing the hitch from the front side of the implement and securing it to one end thereof.

6 Claims, 9 Drawing Figures

INVENTORS
ARLYN R. NELSEN
GERALD F. MEIERS

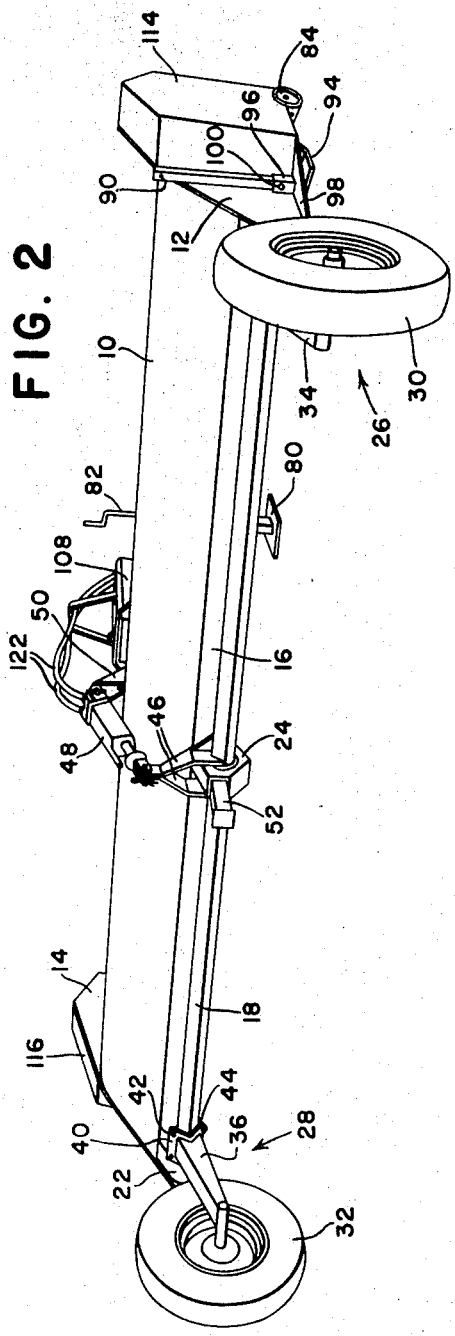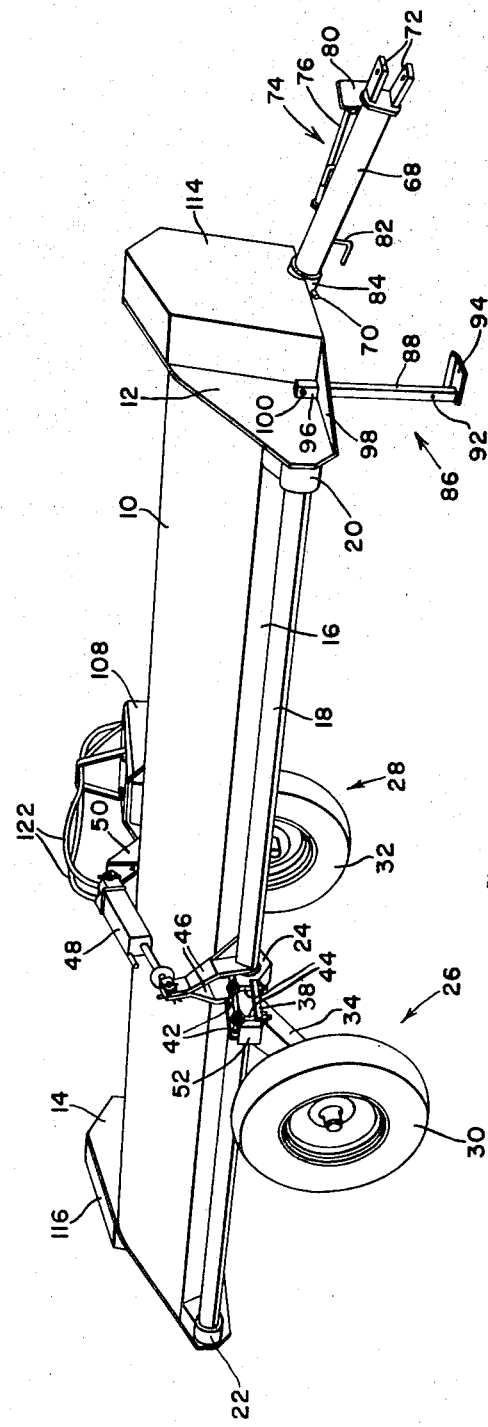

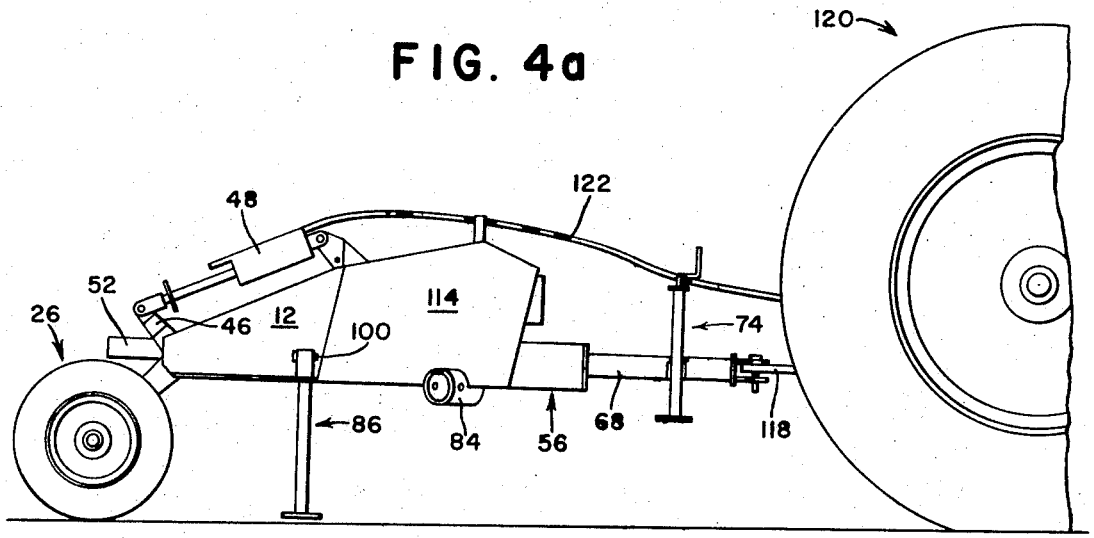

*INVENTORS*
ARLYN R. NELSEN
GERALD F. MEIERS

BY

*John O. Hayes*
ATTORNEY

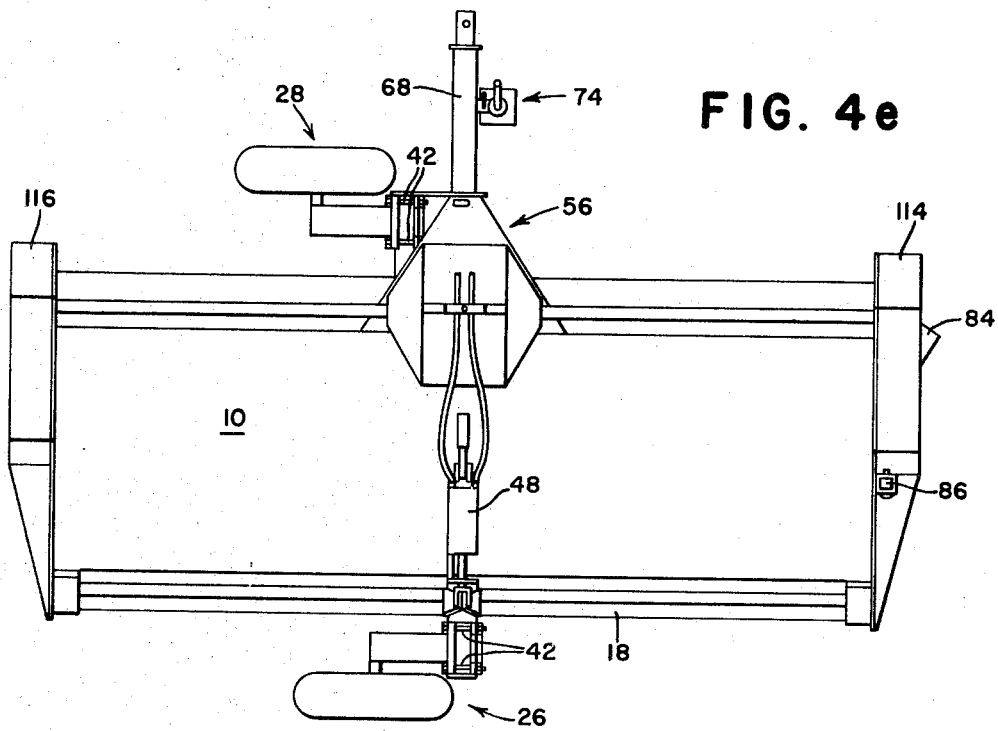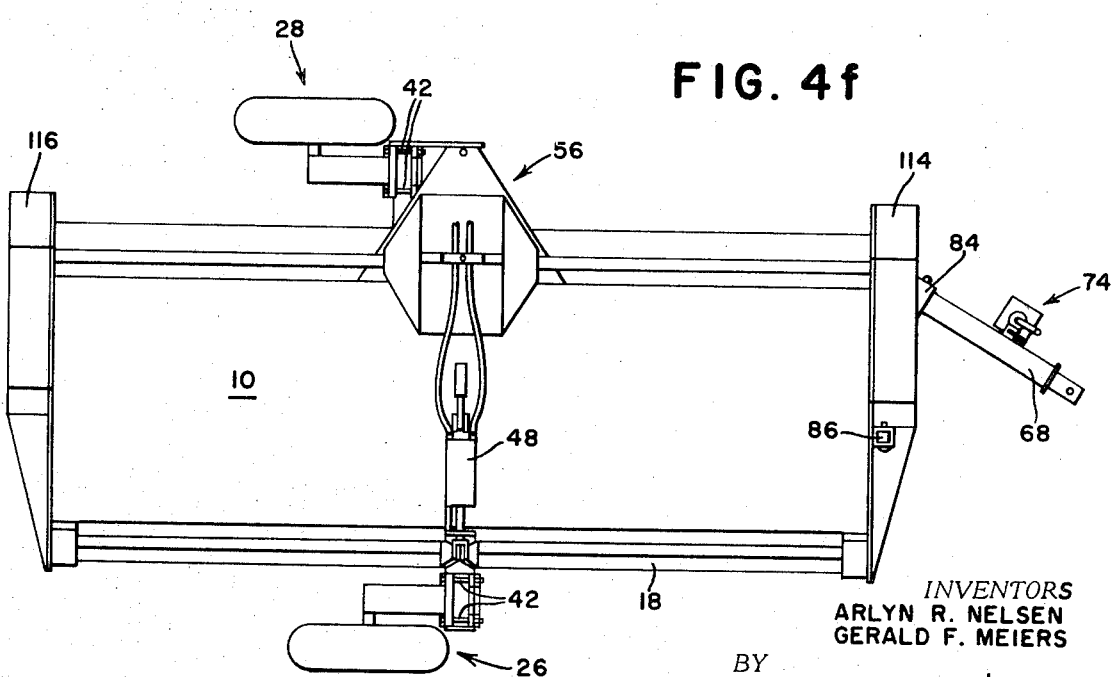

APPARATUS AND METHOD FOR CONVERTING AN IMPLEMENT BETWEEN OPERATING AND TRANSPORT POSITIONS

BACKGROUND OF THE INVENTION

The present invention relates generally to agricultural implements and more particularly to an apparatus and method for converting an elongated implement between a wide operating position and a narrow transport position.

The current trend toward wider agricultural implements has created a need for means whereby such implements can be converted to a narrower width suitable for transport purposes. Although various means have been employed in the past depending on the particular type of implement, in the case of implements having an elongated configuration the conventional method of satisfying this need has been to provide supplementary structure which will permit the implement to be transported in an endwise manner. Such supplementary structure has commonly taken the form of an additional hitch for one end of the implement, and either additional transport wheels, or means for moving some or all of the operating support wheels to an endwise transport position. In devices of this type heretofore known, illustrative of which are those disclosed in U.S. Pat. Nos. 3,288,480 to Calkins et al. issued Nov. 29, 1966 and 3,515,408 to Cagle issued June 2, 1970, the additional structure required has significantly added to the cost of the implement, and the time and effort necessary to convert the implement between its operating and transport positions has been unduly burdensome.

SUMMARY OF THE INVENTION

Accordingly, the primary object of the present invention is to provide a novel apparatus and method for converting an implement between a wide operating position and a narrow, endwise transport position. It is another object to provide such apparatus and method that require the addition of a minimum amount of supplementary structure, and thus necessitate a minimum cost increase. It is yet another object to provide such apparatus and method that require minimum time and effort on the part of the operator to convert the implement between its operating and transport positions.

The apparatus of the invention comprises, generally, a hitch adapted at its forward end for attachment to a towing vehicle, a first hitch support on the front side of the implement for detachably securing the hitch in its operating position, a second hitch support on one end of the implement for detachably securing the hitch in its transport position, and a pair of ground-engaging support wheels, the wheels being alternately securable in either an operating position adjacent to the respective ends of the implement, or an endwise transport position adjacent to the front and rear sides, respectively, of the implement. The wheels are detachably secured, in their operating position, to the opposite ends of a rockshaft extending transversely along the rear side of the implement, and, in their transport position, to a pair of rigid supports on the front and rear sides, respectively, of the implement. Completing the apparatus is an adjustable jack connected to the hitch and a stand on that end of the implement including the second hitch support, the stand being movable between raised and lowered positions.

The method employed to convert the implement from its operating to its transport position comprises the steps of rotating the rockshaft to raise the implement, lowering the stand on the end of the implement, rotating the rockshaft in the opposite direction to lower the implement until the stand assumes the support of that end of the implement and the adjacent wheel is clear of the ground, removing that wheel and attaching it to the support on the rear side of the implement, continuing to rotate the rockshaft to lower the implement until that wheel assembly, in conjunction with the stand, assumes the support of the implement, removing the other wheel and attaching it to the support on the front side of the implement, raising the jack on the hitch to lower the front side of the implement until the support thereof is assumed by the other wheel and the jack is clear of the ground, and finally, detaching the hitch from the support on the front side of the implement and attaching it to the support on the end thereof. The method of converting the implement from its transport position back to its operating position is essentially a reversal of the foregoing steps.

BRIEF DESCRIPTION OF THE DRAWINGS

The preferred embodiment of the present invention will be described in conjunction with the accompanying drawings in which:

FIG. 2 is a right rear perspective view of the implement shown in FIG. 1;

FIG. 3 is a right rear perspective view of the implement in its transport position; and, FIGS. 4a-4f are views illustrating the steps comprising the method of converting the implement from its operating to its transport position.

DESCRIPTION OF THE PREFERRED EMBODIMENT

Figure 1:
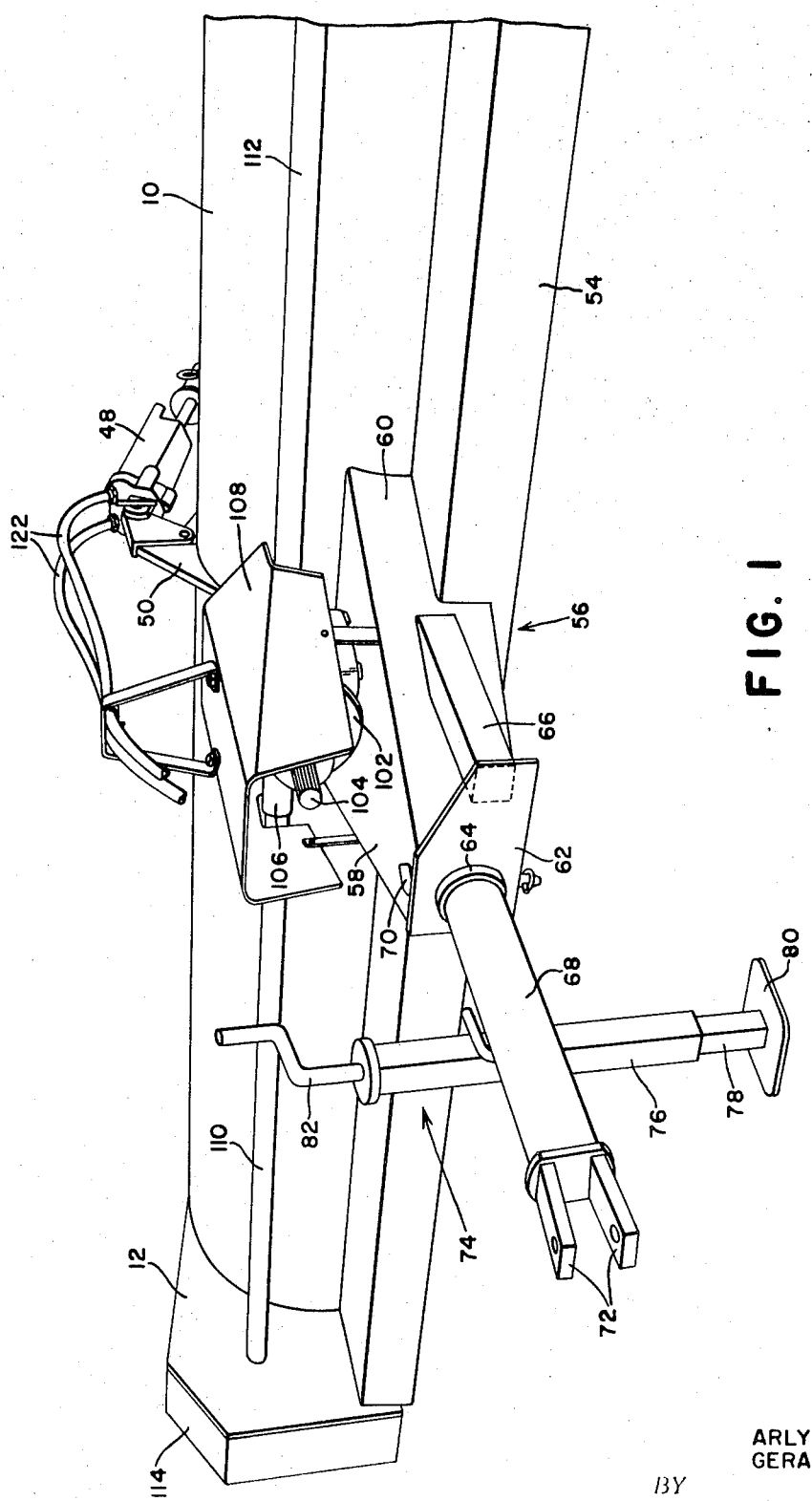
FIG. 1 is a fragmentary perspective view, taken from the left front, of an implement in its operating position incorporating the apparatus of the invention.

In the ensuing description, right- and left-hand reference is determined by facing the direction of travel of the implement when in its operating position.

The apparatus comprising the preferred embodiment of the invention will be described with particular reference to FIGS. 1-3 of the drawings. Although the apparatus is illustrated therein as incorporated on an agricultural flail shredder, it will be apparent that the principles of the invention are equally applicable to various other types of implements having an elongated configuration.

The supporting frame of the flail shredder illustrated includes a transversely elongated top plate 10 having a generally arcuate cross-sectional configuration. A pair of upright end plates 12 and 14 enclose the right and left ends, respectively, of the top plate 10 and include portions which extend both forwardly and rearwardly therefrom. Supported at opposite ends in the plates 12 and 14 and extending transversely therebetween beneath the top plate 10 is a flail rotor shaft (not shown in the drawings) having a plurality of flail knives articulately mounted thereon. The rotor is driven from the power take-off shaft on the tractor used to tow the implement, through means to be subsequently described, and the knives are thus operable to shred vegetation over which the implement is advanced.

As shown in FIGS. 2 and 3 which illustrate the rear side of the implement, an elongated plate 16 depends from the rear edge of the top plate 10 and extends between the end plates 12 and 14. A square tubular rockshaft 18 extends transversely to the rear of the plate 16 and is rotatably supported at its right and left ends in cylindrical bearing members 20 and 22 which, in turn, are fixed to the rearward portions of the plates 12 and 14, respectively. A bearing member 24, rigidly fixed to the center of the plate 16, rotatably supports the center portion of the rockshaft 18. A pair of right and left wheel assemblies, indicated generally by the numerals 26 and 28, are secured to the respective end portions of the rockshaft 18, and are movable vertically relative to the frame of the implement in response to rotation of the rockshaft to raise and lower the rear side of the implement relative to the ground. The assemblies 26 and 28 comprise ground-engaging support wheels 30 and 32 rotatably mounted on the ends of support arms 34 and 36, respectively. The forward ends of the arms 34 and 36 are provided with brackets 38 and 40, respectively, which generally conform to the periphery of the rockshaft 18. A pair of bolts 42 and eyebolts 44 cooperate to detachably secure the brackets 38 and 40, and thus the wheel assemblies 26 and 28, to the rockshaft 18.

A pair of arms 46 are fixed at their lower ends to the rockshaft 18 on opposite sides of the center bearing member 24 and converge upwardly and are joined at their upper ends. An extensible and retractable remote hydraulic cylinder 48 operates between the upper ends of the arms 46 and a longitudinally-spaced bracket 50 fixed to the top plate 10 to rock the shaft 18 in the bearings 20, 22 and 24 and thereby raise and lower the rear side of the implement relative to the ground.

As shown in FIGS. 2 and 3, a wheel assembly support 52, in the form of a short length of square tubing similar in cross-sectional shape to the tubing comprising the rockshaft 18, is fixed to and extends rearwardly from the center rockshaft bearing member 24. In the transport position of FIG. 3, the bracket 38 on the right wheel assembly arm 34 is securable to the support 52 by means of the bolts 42 and 44, to support the rear side of the implement.

Referring now to FIG. 1, a shield plate 54 is fixed along the front side of the top plate 10 and extends transversely between the end plates 12 and 14. Mounted centrally on the plate 54 and the front side of the top plate 10 is a substantially triangular hitch support structure 56 comprising a horizontal upper wall 58 and depending, forwardly converging side walls 60. A vertical plate 62 encloses the forward end of the structure 56 and includes a circular aperture through which the forward end of a hitch-receiving tube 64 extends. The left portion of the plate 62 extends beyond the forward edge of the left wall 60 and rigidly supports the forward end of a wheel assembly support 66. The rearward end of the support 66, which consists of a short length of square tubing corresponding in cross-sectional shape with the rockshaft 18, is fixed to an intermediate portion of the left wall 60. As shown in FIGS. 3, 4e and 4f, the left wheel assembly 28 is attachable to the support 66, by means of the bolts 42 and 44, to support the front side of the implement when disposed in its transport position.

The rearward end of the tubular hitch member or tongue 68 is received within the tube 64 on the structure 56 and is releasably retained therein by means of a pin 70 which extends vertically through aligned apertures in both the hitch 68 and structure 56. At the forward end of the hitch 68 is a pair of apertured, vertically-spaced plates 72 which form a clevis for attaching the implement to the drawbar of a tractor. Mounted medially on the hitch member 68 is a conventional screw jack indicated generally by the numeral 74 and comprising a pair of telescopic members 76 and 78, a support base 80 in the lower end of the number 78, and a crank 82 extending through the upper end of the member 76. The outer telescopic member 76 is pivotally mounted on the side of the hitch 68 so that the jack can swing up to an inoperative position, wherein, as shown in FIG. 3, it is substantially parallel with the hitch 68.

In the figure just referred to, the hitch 68 is shown in its transport position on the right end of the implement. A hitch-receiving tube 84, having the same inside diameter as the tube 64 on the triangular hitch structure 56, is fixed to and extends outwardly at an angle from the right end of the plate 12. The tube 84 is apertured to receive the pin 70 which is thereby operable to secure the hitch 68 in its transport position. As is best shown in FIG. 4f, the angle of the hitch-receiving tube 84 is chosen so that the clevis on the forward end of the hitch 68 will lie approximately on the centerline of the implement when in its transport position.

Again referring to FIG. 3, the right end of the implement is supported on a stand 86, the stand comprising an elongated member 88 having upper and lower pin-receiving apertures 90 and 92, respectively, and a flat base 94 fixed to its lower end. The member 88 is slidably received by a U-shaped bracket 96 fixed to the outer side of the end plate 12 and to the top surface of a horizontal plate 98 extending outwardly from the plate 12. A pin 100 is received in a pair of aligned apertures in the walls of the bracket 96 and the pin is, in turn, selectively engageable with the apertures 92 and 90 in the member 88 to retain the stand in its raised and lowered positions, respectively. As shown in FIG. 3, the stand is operative in the latter position to support the right end of the implement.

The drive train of the implement, through which power is transmitted to the flail rotor from the tractor power take-off shaft, comprises a gearbox 102 mounted, as shown in FIG. 1, on the top of the triangular hitch structure 56 and including a forwardly extending input shaft 104 and a pair of output shafts 106 (only one being shown) extending transversely from each side. The gearbox is partially obscured in FIG. 1 by a safety shield 108. Although not illustrated, a conventional telescoping power shaft is employed to connect the tractor power take-off shaft with the gearbox input shaft 104. A pair of transverse shafts contained within tubular shields 110 and 112 connect the output shafts 106 of the gearbox 102 with the opposite ends of the flail rotor shaft. The outer ends of the transverse shafts are rotatably supported in the forward portions of the end plates 12 and 14. The drive connection between the ends of the shafts and the rotor are concealed in the drawings by means of box-like shields 114 and 116, on the end plates 12 and 14, respectively.

Figure 4C:
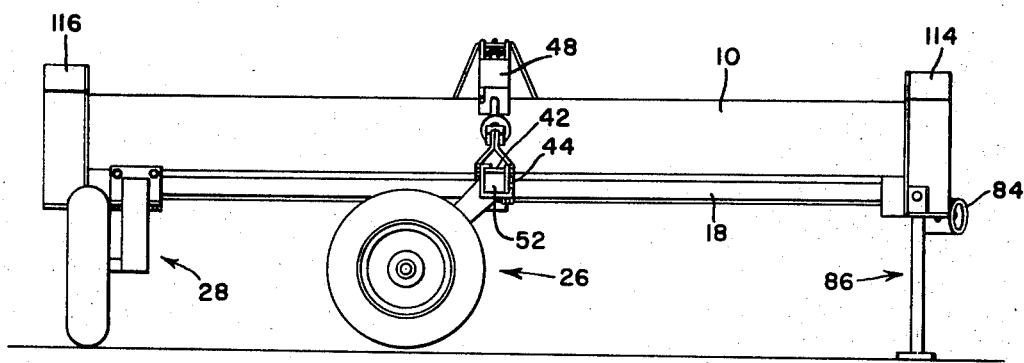
Figure 4D:
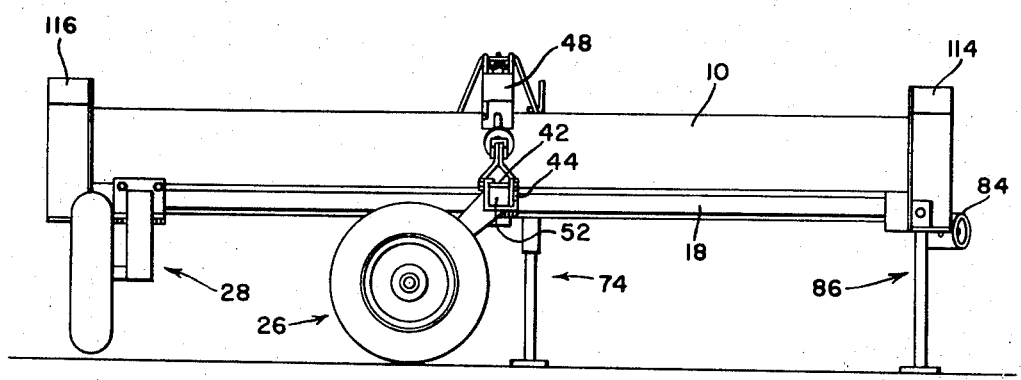

Reference will now be made to FIGS. 4a–4f of the drawings which illustrate the steps necessary to convert the implement from its operating position illustrated in FIGS. 1 and 2 to its transport position illustrated in FIG. 3. Initially, as shown in FIG. 4a, the implement is attached to the drawbar 118 of an agricultural tractor 120, the hydraulic hoses 122 which supply fluid to the remote hydraulic cylinder 48 are connected to the hydraulic system on the tractor, and the telescoping power shaft that connects the tractor power take-off shaft with the gearbox input shaft 104 is removed.

The first step in converting the implement to its transport position consists of rotating the rockshaft 18 by extending the hydraulic cylinder 48, to raise the rear side of the implement to its maximum height. When the implement has been raised, the stand 86 is released from its raised position and is secured in its lowered position. At this point, the rockshaft 18 is rotated in the opposite direction, by retracting the cylinder 48, until the stand 86 assumes the support of the right end of the implement and the right wheel assembly 26 just clears the ground. This position of the implement is shown in FIG. 4b. The wheel assembly 26 can then be detached from the rockshaft 18 by removing the bolts 42 and 44, and secured in its transport position on the support 52 (see FIG. 4c). The support 52 is located on the implement in such a manner that there is sufficient clearance to attach the assembly 26 thereto at this stage. Next, the hydraulic cylinder is retracted further, until the wheel assembly 26, in conjunction with the stand 86, assumes the support of the rear side of the implement and the wheel assembly 28 is raised clear of the ground (see FIG. 4d). The wheel assembly 28 is then removed from the rockshaft 18. At this point, the jack 74 on the hitch 68 is lowered to assume the support of the front side of the implement, the hitch 68 is disconnected from the tractor drawbar 18, and since the hydraulic cylinder 48 is no longer necessary, the hoses 122 are disconnected from the tractor hydraulic system. The front side of the implement must be raised by the jack 74 until the wheel assembly 28 can be attached to the wheel support 66 on the front side of the implement, as shown in FIG. 4e. Once the assembly 28 has been so attached, the jack 74 is then used to lower the front side of the implement until the support thereof is assumed by the wheel 32 of the assembly 28. The hitch 68 can then be removed from the support structure 56 on the front side of the implement and inserted in the support 84 on the right end thereof. Finally, the jack 74 is lowered to assume the support of the right end of the implement and the stand 86 is returned to its raised position.

The procedure for converting the implement from its transport position back to its operating position is a mere reversal of the foregoing and will thus not be described.

We claim:

1. An implement comprising: elongated frame means having front and rear sides and first and second ends; a hitch member detachably connected to the front side of the frame means and having an extensible and retractable jack connected thereto, the hitch member being operable to support the front side of the frame means; a rockshaft extending transversely along the rear side of the frame means; first and second wheel means detachably connected to the rockshaft and normally operable to support the first and second ends, respectively, of the frame means; means to rotate the rockshaft and thereby raise and lower the wheel means relative to the frame means; a stand connected to the frame means adjacent to the first end thereof and movable between raised and lowered positions, the stand in the latter position being operable to assume the support of the first end of the frame means when the rockshaft is rotated to raise the wheel means relative to the frame means; a first wheel support on the rear side of the frame means, the first wheel means being attachable in an endwise transport position to the first wheel support and operable in the latter position to assume the support of the rear side of the frame means when the first end of the frame means is supported on the stand and the rockshaft is rotated to raise the second wheel means relative to the frame means; a second wheel support on the front side of the frame means, the second wheel means being attachable in an endwise transport position to the second wheel support and operable in the latter position to assume the support of the front side of the frame means when the jack on the hitch member is retracted; and a hitch support on the first end of the frame means, the hitch member being attachable to the hitch support for endwise transport of the frame means.

2. A method of converting the implement defined in claim 1 from an operating position wherein the front side of the frame means is supported by the hitch member and the first and second ends of the frame means are supported by the first and second wheel means, respectively, to an endwise transport position wherein the first end of the frame means is supported by the hitch member and the rear and front sides of the frame means are supported by the first and second wheel means, respectively, comprising the steps of rotating the rockshaft to lower the wheel means relative to the frame means; positioning the stand in its lowered position; rotating the rockshaft to raise the wheel means relative to the frame means until the stand assumes the support of the first end of the frame means; detaching the first wheel means from the rockshaft; attaching the first wheel means in an endwise transport position to the first wheel support; rotating the rockshaft to raise the second wheel means relative to the frame means until the first wheel means assumes the support of the rear side of the frame means; detaching the second wheel means from the rockshaft; attaching the second wheel means in an endwise transport position to the second wheel support; retracting the jack on the hitch member until the second wheel means assumes the support of the front side of the frame means; and attaching the hitch member to the hitch support on the first end of the frame means.

3. An implement comprising: elongated frame means having front and rear sides and first and second ends; a hitch member detachably connected to the front side of the frame means and having an extensible and retractable jack connected thereto, the hitch member being operable to support the front side of the frame means; first and second wheel means detachably connected to the frame means for vertical movement relative thereto, the first and second wheel means being positioned adjacent to and normally operable to support the first and second ends, respectively, of the frame means; means to raise and lower the wheel means relative to the frame means; a stand connected to the frame means adjacent to the first end thereof and movable between raised and lowered positions, the stand in the latter position being operable to assume the support of the first end of the frame means when the first wheel means is raised relative to the frame means; a first wheel support on the rear side of the frame means, the first wheel means being attachable in an endwise transport position to the first wheel support and operable in the latter position to assume the support of the rear side of the frame means when the first end of the frame means is supported on the stand and the second wheel means is raised relative to the frame means; a second wheel support on the front side of the frame means, the second wheel means being attachable in an endwise transport position to the second wheel support and operable in the latter position to assume the support of the front side of the frame means when the jack on the hitch member is retracted; and a hitch support on the first end of the frame means, the hitch member being attachable to the hitch support for endwise transport of the frame means.

4. A method of converting the implement defined in claim 3 from an operating position wherein the front side of the frame means is supported by the hitch member and the first and second ends of the frame means are supported by the first and second wheel means, respectively, to an endwise transport position wherein the first end of the frame means is supported by the hitch member and the rear and front sides of the frame means are supported by the first and second wheel means, respectively, comprising the steps of lowering the first wheel means relative to the frame means; positioning the stand in its lowered position; raising the wheel means relative to the frame means until the stand assumes the support of the first end of the frame means; detaching the first wheel means from the rear side of the frame means; attaching the first wheel means in an endwise transport position to the first wheel support; raising the second wheel means relative to the frame means until the first wheel means assumes the support of the rear side of the frame means; detaching the second wheel means from the rear side of the frame means; attaching the second wheel means in an endwise transport position to the second wheel support; retracting the jack on the hitch member until the second wheel means assumes the support of the front side of the frame means; and attaching the hitch member to the hitch support on the first end of the frame means.

5. Support means for an implement comprising: a hitch member having an extensible and retractable jack mounted thereon; first hitch support means on the front portion of the implement, said hitch member being detachably connectible to said first hitch support means and operable to support the front portion of the implement during normal operation thereof; second hitch support means on one end portion of the implement, said hitch member being detachably connectible to said second hitch support means and operable to support said one end portion of the implement for endwise transport thereof; a support mounted on said one end portion of the implement and movable between raised and lowered positions, the support being operable in the latter position to support said one end portion of the implement relative to the ground; transverse rockshaft means rotatably mounted on the rear portion of the implement; first and second ground-engaging wheel means detachably connectible to said rockshaft means at transversely spaced locations thereon and operable to support the rear portion of the implement during normal operation thereof, said wheel means being movable vertically relative to the implement in response to rotation of said rockshaft means; and first and second wheel support means on the front and rear portions, respectively, of the implement, said first and second ground-engaging wheel means being detachably connectible to said first and second wheel support means and operable to support the front and rear portions of the implement for endwise transport thereof.

6. A method of converting the implement defined in claim 5 from an operating position, wherein said first hitch support means and said first and second wheel means are connected to said rockshaft means, to an endwise transport position, wherein said hitch means is connected to said second hitch support means and said first and second wheel means are connected to said first and second wheel support means, comprising the steps of: rotating the rockshaft means to raise the rear portion of the implement; positioning the support in its lowered position; rotating the rockshaft means to raise said wheel means relative to the frame until the support assumes the support of said one end of the implement; detaching the wheel means closest to the support from the rockshaft means and connecting it to the second wheel support means; rotating the rockshaft means to raise the remaining wheel means until the wheel means connected to the second wheel support means assumes the support of the rear portion of the implement; detaching the remaining wheel means from the rockshaft and connecting it to the first wheel support means; lowering the front portion of the implement by means of said extensible and retractable jack until said jack clears the ground and said wheel means on the first wheel support means assumes the support of the front portion of the implement; and detaching the hitch means from the first hitch support means and connecting it to the second hitch support means.

* * * * *